US012738640B1

(12) United States Patent
Harriot et al.

(10) Patent No.: US 12,738,640 B1
(45) Date of Patent: Sep. 15, 2026

(54) METHOD AND DEVICE FOR ADJUSTING A FEED ANTENNA

(71) Applicant: The Government of the United States as represented by the Director, National Security Agency, Ft. George G. Meade, MD (US)

(72) Inventors: Gregory S. Harriot, Glenelg, MD (US); Ismael Quinones, Laurel, MD (US); Dylan D. Ross, Annandale, VA (US); Brian C Sherlock, Crofton, MD (US); Devon M. Zollinhofer, Pasadena, MD (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 108 days.

(21) Appl. No.: 18/790,382

(22) Filed: Jul. 31, 2024

(51) Int. Cl.
*H01Q 3/18* (2006.01)

(52) U.S. Cl.
CPC .................................... *H01Q 3/18* (2013.01)

(58) Field of Classification Search
CPC H01Q 19/10; H01Q 3/12; H01Q 1/12; H01Q 3/18
See application file for complete search history.

(56) References Cited

U.S. PATENT DOCUMENTS 5,351,060 A * 9/1994 Bayne ...................... H01Q 3/20 342/359
5,874,925 A 2/1999 Choi
6,166,700 A * 12/2000 Jenkin ...................... H01Q 3/18 343/882
6,262,688 B1 * 7/2001 Kasahara ............. H01Q 19/062 343/765
6,943,750 B2 * 9/2005 Brooker ................... H01Q 3/18 343/781 CA
7,196,675 B2 3/2007 Wolfenden et al.
9,035,839 B2 5/2015 Scott et al.
9,812,775 B2 11/2017 Zahavi et al.
10,784,670 B2 * 9/2020 Bennett .................. H02G 7/205
2010/0026607 A1 * 2/2010 Imai .......................... G01S 7/03 343/753
2012/0081263 A1 * 4/2012 Yang ...................... H01Q 19/17 343/880
2023/0155297 A1 5/2023 Saraf

* cited by examiner

*Primary Examiner* — Hai V Tran

(57) ABSTRACT

In one implementation, a method performed by a feed antenna controller that includes an adjustment device for adjusting at least one of a position or a direction associated with the feed antenna coupled thereto includes: determining a first set of displacement values, wherein the first set of displacement values includes at least two of: feed antenna translational displacement values or feed antenna rotational displacement values; and adjusting at least one of the position or the direction of the feed antenna by operating the adjustment device based on the first set of displacement values. In some implementations, the feed antenna is further coupled to a support arm that supports the feed antenna relative to a reflector, and the adjustment device adjusts the position or the direction of the feed antenna relative to static positions for the support arm and the reflector based on the first set of displacement values.

20 Claims, 10 Drawing Sheets

METHOD AND DEVICE FOR ADJUSTING A FEED ANTENNA

TECHNICAL FIELD

The present disclosure generally relates to satellite tracking, and in particular, to systems, methods, and devices for adjusting a feed antenna of an antenna system to track a satellite.

BACKGROUND

One approach to satellite tracking with a directional antenna includes motorizing the entire antenna assembly. As one example, an antenna mount for aiming a parabolic antenna towards a satellite may physically adjust the entire parabolic antenna. While effective in aiming towards the satellite, moving the entire parabolic antenna often requires complicated machinery and ongoing maintenance thereto. Wind loads and other environmental factors may further exacerbate this challenge. As another example, an actuator may move one or more boom arms supporting a feed antenna relative to a reflector to adjust the direction of the feed antenna. While this solution may provide some advantages over the previously mentioned approach, simpler methods and mechanisms are desirable especially those that can be used to retrofit existing antenna assemblies.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
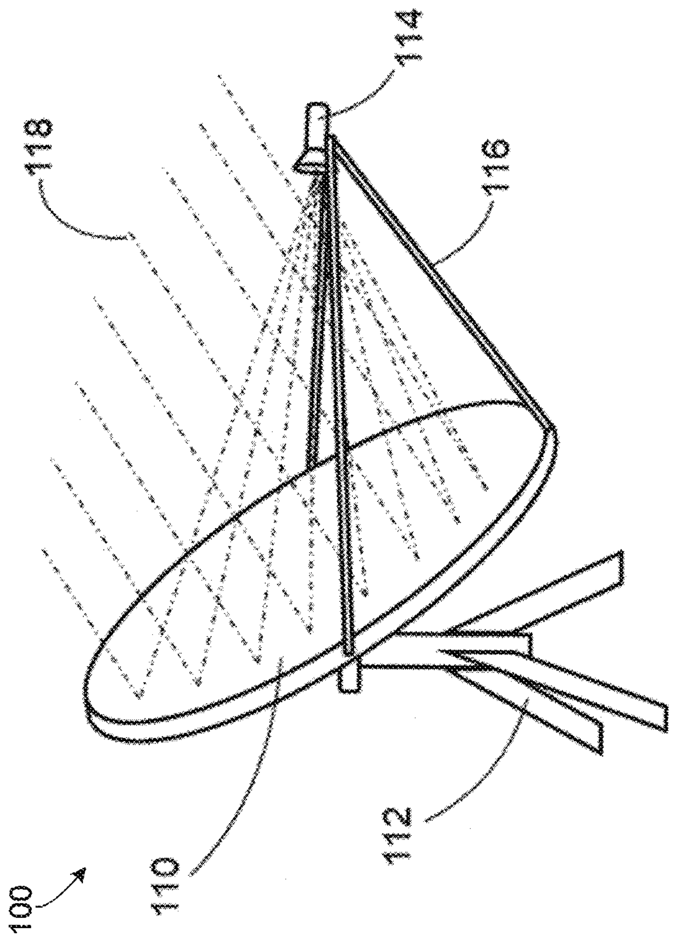
Figure 1 (prior art)
FIG. 1 illustrates an example of an antenna system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for adjusting a feed antenna. In some implementations, a method is performed by a feed antenna controller coupled to a feed antenna, wherein the feed antenna controller includes an adjustment device for adjusting at least one of a position or a direction associated with the feed antenna. The method includes: determining a first set of two or more displacement values for the feed antenna, wherein the first set of two or more displacement values includes at least two of: one or more feed antenna translational displacement values or one or more feed antenna rotational displacement values; and adjusting at least one of the position or the direction of the feed antenna by operating the adjustment device based on the first set of two or more displacement values for the feed antenna. In some implementations, the feed antenna is further coupled to one or more support arms that support the feed antenna relative to a reflector, and wherein the adjustment device adjusts at least one of the position or the direction associated with the feed antenna relative to static positions for the one or more support arms and the reflector based on the first set of two or more displacement values for the feed antenna.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DETAILED DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Geostationary satellites experience orbital perturbations for a variety of reasons. As one example, a geostationary satellite may experience orbital perturbations due to a combination of its non-zero inclination and/or eccentricity and the oblate ellipsoid shape of the Earth. As another example, a geostationary satellite may experience orbital perturbations due to a combination of lunar gravity, solar gravity, and the oblate ellipsoid shape of the Earth. As yet another example, a geostationary satellite may experience orbital perturbations due to longitudinal drift caused by the equatorial eccentricity of the Earth. As yet another example, a geostationary satellite may experience orbital perturbations due to gravitation effects from transient celestial bodies such as comets, asteroids, etc. As yet another example, a geostationary satellite may experience orbital perturbations due to solar winds and/or radiation pressure. One of ordinary skill in the art will appreciate that a satellite stationed at a Lagrange point relative to the Earth or another celestial body may experience similar orbital perturbations. Furthermore, one of ordinary skill in the art will appreciate that a satellite with a non-geostationary orbit may experience similar orbital perturbations.

The implementations disclosed herein describe a feed antenna controller that may complement and/or retrofit an antenna system in order to adjust the feed antenna thereof to account for and/or track the orbital perturbations of a satellite (e.g., in a geostationary orbit, stationed at a Lagrange point relative to the Earth, or the like) without introducing complicated machinery that motorizes the reflector and/or the support arms of the antenna system as contemplated by previous satellite tracking systems. According to some implementations, the feed antenna controller is coupled to a feed antenna of an antenna system, wherein the feed antenna controller includes an adjustment device for adjusting at least one of a position or a direction associated with the feed antenna based on a first set of two or more displacement values for the feed antenna. The feed antenna is further coupled to one or more support arms that support the feed antenna relative to a reflector of the antenna system, and wherein the adjustment device adjusts at least one of the position or the direction associated with the feed antenna relative to static positions for the one or more support arms and the reflector based on the first set of two or more displacement values for the feed antenna.

As such, for example, an antenna system whose feed antenna is adjusted by the feed antenna controller to correct for orbital perturbations of a geostationary satellite may experience increased gain, bandwidth, and/or the like while communicating with the geostationary satellite. Furthermore, this improved ability to track the orbital perturbations of the geostationary satellite by adjusting the feed antenna of the antenna system (e.g., beam steering from the ground tracking station) may in turn reduce the onboard station-keeping resources needed by the geostationary satellite (e.g., less propellant, reduced thruster size/weight, and/or the like). Additionally, an overhead observer may have a more difficult time determining the precise direction of an antenna system whose feed antenna is adjusted by the feed antenna controller as opposed to previous satellite tracking systems where the reflector and/or the support arms of the antenna system are motorized.

FIG. 1 illustrates an example of an antenna system 100 in accordance with some implementations. As shown in FIG. 1, the antenna system 100 includes a parabolic reflector 110 mounted on a base 112. This parabolic reflector 110 may receive an electromagnetic (EM) signal 118 and both reflect and focus that signal toward a feed antenna 114 rigidly secured to the parabolic reflector 110 via one or more support arms 116 (sometimes also referred to herein as "boom arms"). This parabolic reflector 110 may also reflect and align a diverging EM signal emanating from the feed antenna 114 outward. For example, the antenna system 100 may be used to communicate with satellites orbiting the Earth for a variety of purposes such as navigation, communications, weather forecasting, scientific research, reconnaissance, and/or the like. While the parabolic reflector 110 is depicted in FIG. 1, one of ordinary skill in the art will appreciate that other shapes and styles of reflectors, such as toroidal or non-parabolic, may also be used.

Figure 2:
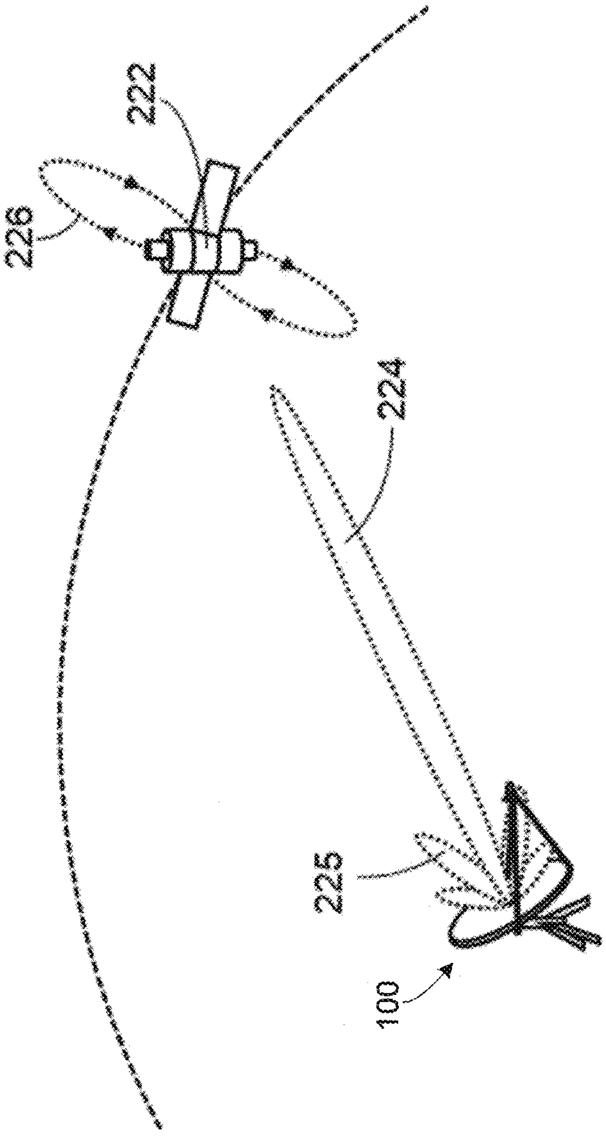
Figure 2 (prior art)
FIG. 2 illustrates an example of the antenna system in FIG. 1 in communication with a satellite orbiting the Earth in accordance with some implementations.

FIG. 2 illustrates an example of the antenna system 100 in FIG. 1 in communication with a satellite 222 orbiting the Earth in accordance with some implementations. The satellite 222 may be configured to generally orbit at the same speed as the Earth such that the satellite 222 appears in a relatively fixed position in the sky relative to the antenna system 100; an arrangement referred to as "geostationary." An EM signal emanating from the antenna system 100 may include a main lobe 224 associated with the highest power or exhibiting the greatest field strength of the EM signal and several side lobes 225 associated with less power or exhibiting lesser field strength. Due to the geostationary position of the satellite 222 relative to the antenna system 100, the main lobe 224 may be fixed in a specific orientation directed toward the satellite 222.

However, geostationary satellites may exhibit variations in their orbits, which may limit the effectiveness of the antenna system 100 when fixed. For example, a geostationary satellite's position may change over time, resulting in a perturbation pattern 226 such as an ellipse, a teardrop, a figure-eight, a Lissajous pattern, or the like. The perturbation pattern 226 may occur due to the non-zero inclination and/or eccentricity of the satellite 222 in combination with the Earth's oblate ellipsoid shape. The perturbation pattern 226 may also occur due to dynamic gravitational effects caused by the sun, moon, and/or other transient celestial bodies, such as comets, asteroids, planets, etc., on the satellite 222. One of ordinary skill in the art will appreciate that a satellite stationed at a Lagrange point relative to the Earth or another celestial body may exhibit a similar perturbation pattern. To account for or track the perturbation pattern 226 of the satellite 222, it may be desirable to alter the orientation of the main lobe 224 of the EM signal emanating from the antenna system 100 as described in more detail below with reference to at least FIGS. 3, 4, and 6.

Figure 3:
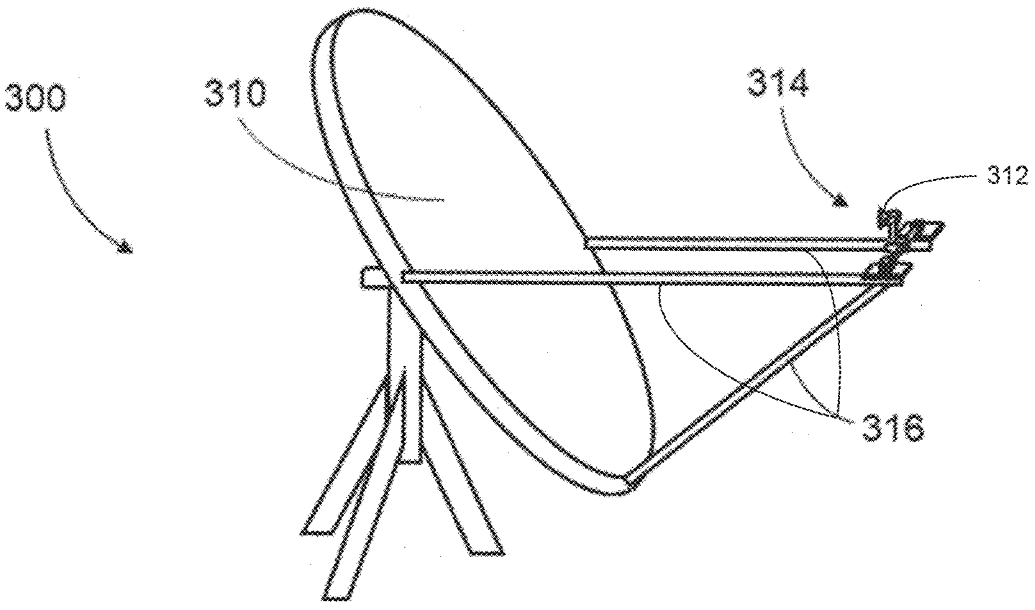
FIG. 3 illustrates an example of an antenna system with a feed antenna controller for translating and/or rotating a feed antenna with as many as six degrees of freedom (6DOF) in accordance with some implementations.

FIG. 3 illustrates an example of an antenna system 300 with a feed antenna controller 314 (sometimes also referred to herein as an "antenna control mechanism") for translating and/or rotating a feed antenna 312 with as many as 6DOF in accordance with some implementations. As shown in FIG. 3, the antenna system 300 includes a parabolic reflector 310 and at least one support arm 316 coupled to the parabolic reflector 310, which supports a feed antenna controller 314 relative to the parabolic reflector 310. In some implementations, the feed antenna controller 314 is capable of rectilinearly-translating the feed antenna 312 relative to the parabolic reflector 310 and/or the at least one support arm 316. The feed antenna controller 314 may be coupled and/or secured to the at least one support arm 316. One of ordinary skill in the art will appreciate that, in various embodiments, the less mass to be moved to adjust the feed antenna 312, the less expensive, energy intensive, time consuming, and complicated those changes may be to execute. While the parabolic reflector 310 is depicted in FIG. 3, one of ordinary skill in the art will appreciate that other shapes and styles of reflectors, such as toroidal or non-parabolic, may also be used.

Figure 4:
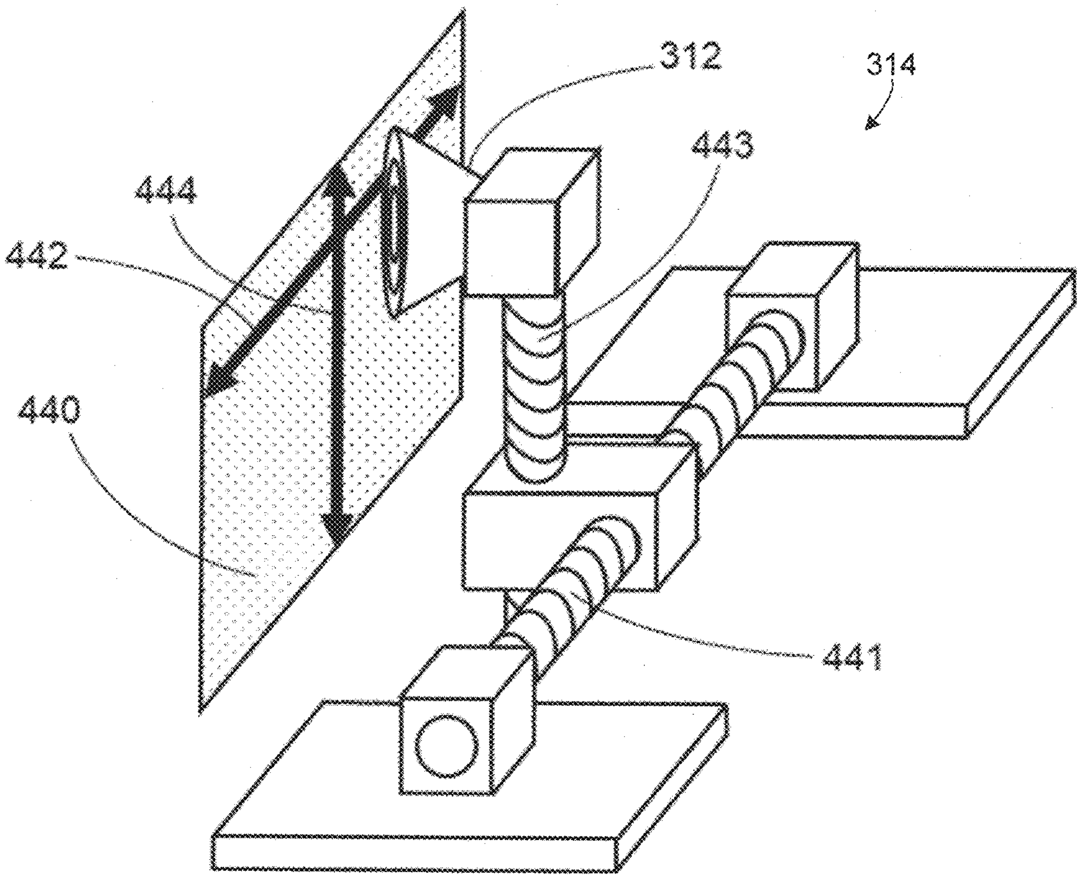
FIG. 4 illustrates an example of the feed antenna controller in FIG. 3 that is capable of rectilinearly-translating the feed antenna in two perpendicular directions within a focal plane in accordance with some implementations.

FIG. 4 illustrates an example of the feed antenna controller 314 in FIG. 3 that is capable of rectilinearly-translating the feed antenna 312 in two perpendicular directions within a focal plane 440 in accordance with some implementations. As shown in FIG. 4, the feed antenna 312 is held in position by a first leadscrew 441 capable of rectilinearly-translating the feed antenna 312 in a horizontal direction 442 within the focal plane 440 by rotating the first leadscrew 441, for example, with a stepper motor, a servo motor, or the like. The feed antenna 312 may also be held in position by a second leadscrew 443 capable of rectilinearly-translating the feed antenna 312 in a vertical direction 444 within the focal plane 440 by rotating the second leadscrew 443, for example, with a stepper motor, a servo motor, or the like. As such, the feed antenna 312 may be placed at specific points within the focal plane 440 by rotating the first leadscrew 441 and/or the second leadscrew 443 with stepper motors, servo motors, and/or the like. One of ordinary skill in the art will appreciate that the first leadscrew 441 and the second leadscrew 443 may be replaced by or complemented with other mechanical, electro-mechanical, electromagnetic, or the like assemblies for rectilinearly-translating the feed antenna 312.

While FIG. 4 illustrates the ability of the feed antenna controller 314 to rectilinearly-translate the feed antenna 312 in two perpendicular directions within the focal plane 440, one of ordinary skill in the art will appreciate that, in some implementations, the feed antenna controller 314 may also translate the feed antenna 312 in a depth direction that is perpendicular to both the horizontal direction 442 and the vertical direction 444 via one or more motors or the like. While FIG. 4 illustrates the ability of the feed antenna controller 314 to rectilinearly-translate the feed antenna 312 in two perpendicular directions within the focal plane 440, one of ordinary skill in the art will appreciate that, in some implementations, the feed antenna controller 314 may further rotate the feed antenna 312 about a first axis associated with the first leadscrew 441 (e.g., the x axis associated with the horizontal direction 442), about a second axis associated with the second leadscrew 443 (e.g., the z axis associated with the vertical direction 444), and/or about a third axis (e.g., the y axis associated with the depth direction) via one or motors or the like.

Figure 5A:
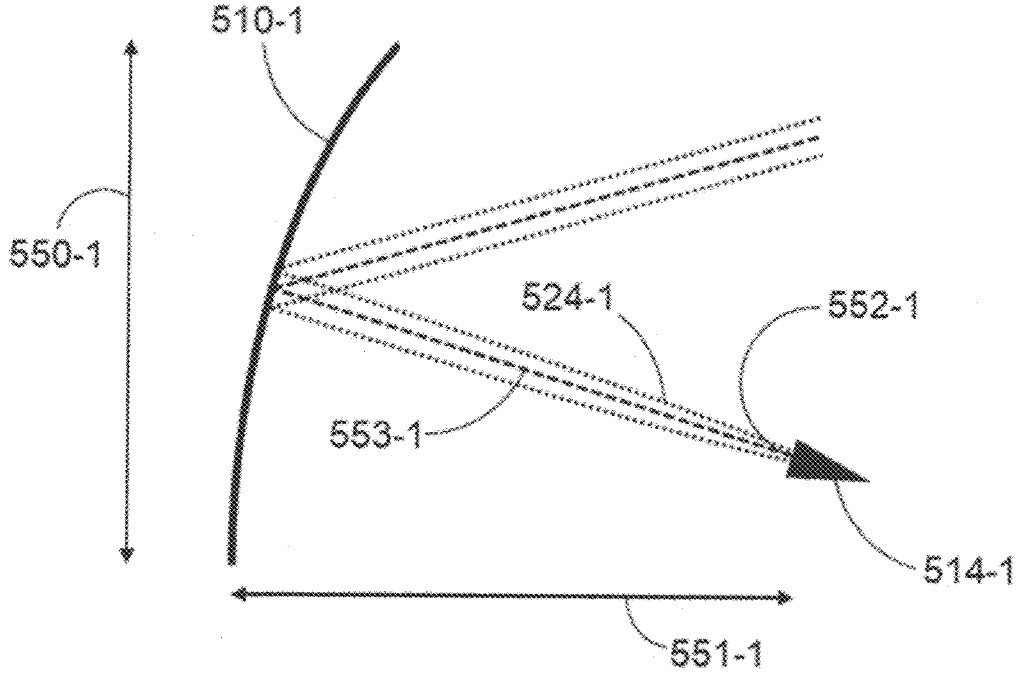
FIG. 5A illustrates a first example of a main lobe of an electromagnetic (EM) signal relative to a reflector and a feed antenna in accordance with some implementations.

FIG. 5A illustrates a first example of a main lobe of an EM signal 524-1 relative to a reflector 510-1 and a feed antenna 514-1 in accordance with some implementations. As shown in FIG. 5A, the reflector 510-1 including a substantially parabolic shape including a diameter (D) 550-1, a focal length (f) 551-1, and a focal point 552-1 disposed at a radial distance (Rc) 553-1 from a center of the reflector 510-1. The feed antenna 514-1 may be positioned at the focal point 552-1 allowing for the highest power or greatest field strength of the EM signal out from the feed antenna 514-1 to be reflected and directed toward a target (e.g., a satellite) or from the target to the feed antenna 514-1.

Figure 5B:
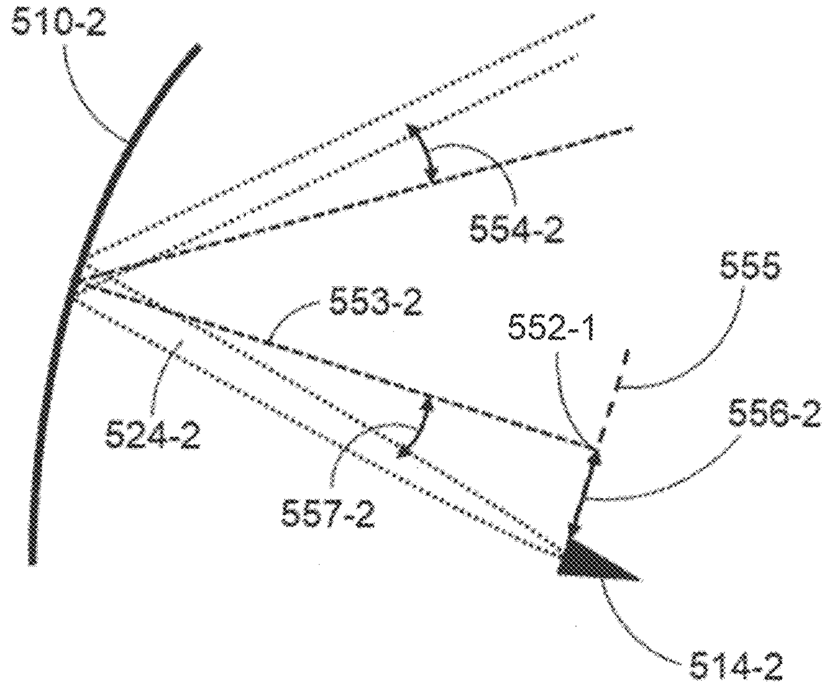
FIG. 5B illustrates a second example of a main lobe of an EM signal relative to a reflector and a feed antenna after a change in the beam scan angle of the EM signal in accordance with some implementations.

FIG. 5B illustrates a second example of a main lobe of an EM signal 524-2 relative to a reflector 510-2 after a change in the beam scan angle 554-2 of the EM signal relative to the focal point 552-1 in accordance with some implementations. For example, as shown in FIG. 5B, a target has shifted an angular distance ($\theta_B$, $\varphi_B$) 554-2, known as the beam scan angle, relative to the focal point 552-1 in FIG. 5A. While this positional shift is depicted in two dimensions to aid comprehension, in practice it may occur in any three-dimensional direction. To ease computation, calculations are expressed herein in terms of two coplanar perpendicular linear directions, x and z, and two corresponding angular directions, θ and φ.

To track the target during this positional shift, a feed antenna 514-2 may be shifted along a focal plane 555 2 that lies a radial distance 553-2 relative to a center of the reflector 510-2. The feed antenna 514-2 is shifted a linear distance defined by translational displacement value(s) ($\delta_x$, $\delta_z$) 556-2 along the focal plane 555. This linear shift of the feed antenna 514-2 alters an angular distance that the main lobe 524-2 of the EM signal, emanating out from the feed antenna 514-2 or received thereby, known as a feed tilt angle ($\theta_F$, $\theta_F$) 557-2, reflects off of the parabolic reflector 510-2.

To calculate the translational displacement value(s) ($\delta_x$, $\delta_z$) 556-2 that the feed antenna 514-2 should be moved to track a positional shift of the target, a beam scan deviation factor $\gamma=\theta_B/\theta_F$ is first calculated, which may be approximated as equation (1) below where k is a constant 0.36

$$\gamma = \frac{1 + k\left(\frac{D}{4f}\right)^2}{1 + \left(\frac{D}{4f}\right)^2} \quad (1)$$

Then, given beam scan angle equations (2) and (3):

$$\theta_B = -\gamma\tan^{-1}\left(\frac{\delta_z}{\sqrt{\delta_x^2 + R_c^2}}\right) \quad (2)$$

$$\varphi_B = -\gamma\tan^{-1}\left(\frac{\delta_x}{R_c}\right) \quad (3)$$

and feed tilt angle equations (4) and (5):

$$\tan\theta_F = \frac{\delta_z}{\delta_\rho} = \frac{\delta_z}{\sqrt{\delta_x^2 + R_c^2}} \quad (4)$$

$$\tan\varphi_F = \frac{\delta_x}{R_c} \quad (5)$$

The translational displacement values may then be calculated by solving for translational displacement variable $\delta_x$ in equation (6) and for translational displacement variable $\delta_z$ in equation (7) shown below.

$$\delta_x = -R_c\tan\left(\left(\frac{\pi\varphi_B}{180}\right)\Big/\gamma\right) \quad (6)$$

$$\delta_z = -\left(\sqrt{\delta_x^2 + R_c^2}\right)\tan\left(\left(\frac{\pi\theta_B}{180}\right)\Big/\gamma\right) \quad (7)$$

Figure 6:
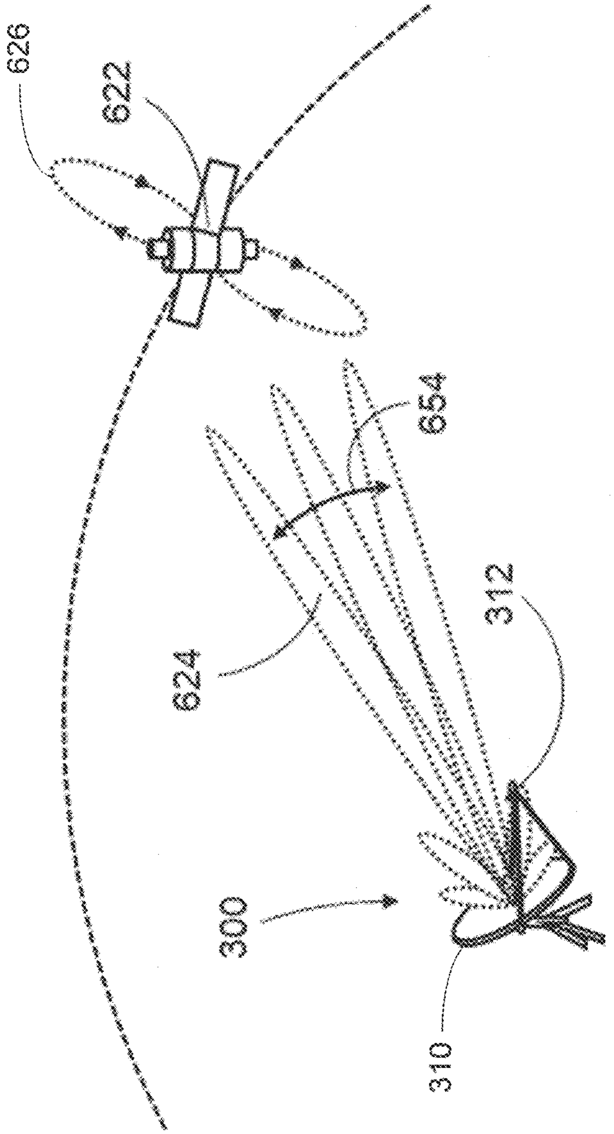
FIG. 6 illustrates the example antenna system in FIG. 3 in communication with a satellite orbiting the Earth in accordance with some implementations.

FIG. 6 illustrates the example antenna system 300 in FIG. 3 in communication with a satellite 622 orbiting the Earth in accordance with some implementations. For example, with reference to FIGS. 3 and 6, the feed antenna 312 is rectilinearly-translatable relative to the parabolic reflector 310 to account for a perturbation pattern 626 of the geostationary satellite 622. An EM signal, emanating from the antenna system 300 or the satellite 622, may include a radiation pattern with a main lobe 624 dependent on the position of the feed antenna 312. As the feed antenna 312 is rectilinearly-translated within a plane relative to the parabolic reflector 310 (e.g., the focal plane 555 in FIG. 5B), the angular orientation of this main lobe 624 is altered some beam scan angle 654. Thus, through rectilinearly-translating the feed antenna 312 of the antenna system 300, the main lobe 624 may be directed toward the satellite 622, or toward an anticipated future location of the satellite 622 along the perturbation pattern 626, allowing the antenna system 300 to track the satellite 622 in the sky without moving the parabolic reflector 310 or its associated support arm(s) 316.

Figure 7:
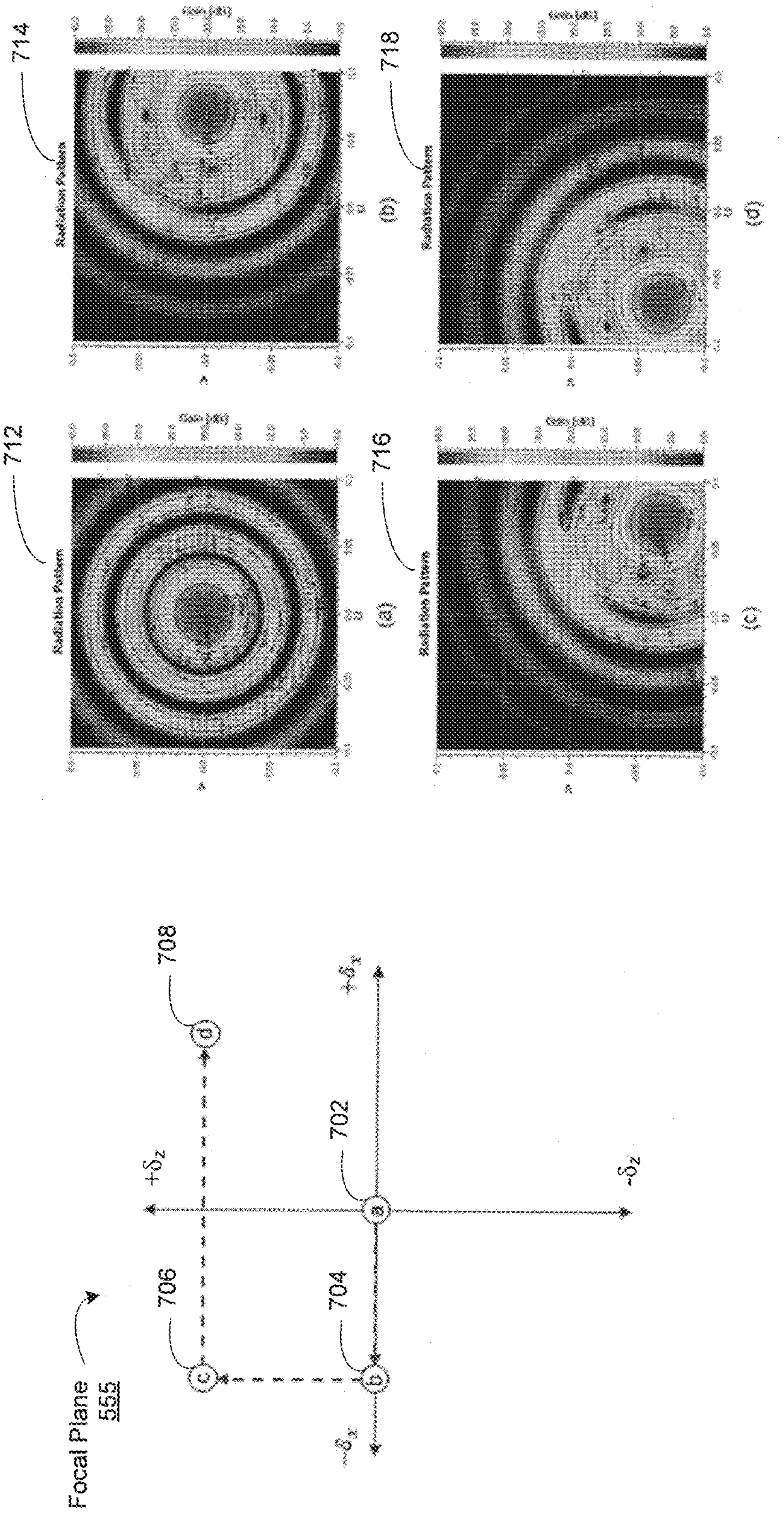
FIG. 7 illustrates example radiation patterns associated with the antenna system in FIG. 3 based on different displacement scenarios in accordance with some implementations.

FIG. 7 illustrates example different displacement scenarios to account for shifting radiation patterns caused by a satellite effected by orbital perturbations in accordance with some implementations. As one example, with reference to the antenna system 300 in FIGS. 3 and 6, the antenna feed controller 314 determines a linear shift 702 including null values for the translational displacement values $\delta_x=0$ and $\delta_z=0$ relative to the focal plane 555 for the feed antenna 312 to account for the radiation pattern 712. In this example, the radiation pattern 712 is centered at the origin (0,0); thus, the antenna feed controller 314 determines that no displacement of the feed antenna 312 is called for in this example.

As another example, with reference to the antenna system 300 in FIGS. 3 and 6, the antenna feed controller 314 determines a linear shift 704 where the feed antenna controller 314 moves the feed antenna 312 according to a negative value for the translational displacement variable $\delta_x$ and a null value for the translational displacement variable $\delta_z=0$ to account for the radiation pattern 714 of the downlink signal received from the satellite effected by orbital perturbations, which is no longer centered at the origin (0,0). As yet another example, with reference to the antenna system 300 in FIGS. 3 and 6, the antenna feed controller 314 determines a linear shift 706 where the feed antenna controller 314 moves the feed antenna 312 according to a negative value for the translational displacement variable $\delta_x$ and a positive value for the translational displacement variable $\delta_z$ to account for the radiation pattern 716 of the downlink signal received from the satellite effected by orbital perturbations, which is no longer centered at the origin (0,0).

As yet another example, with reference to the antenna system 300 in FIGS. 3 and 6, the antenna feed controller 314 determines a linear shift 708 where the feed antenna controller 314 moves the feed antenna 312 according to a positive value for the translational displacement variable $\delta_x$ and a positive value for the translational displacement variable 82 to account for the radiation pattern 718 of the downlink signal received from the satellite effected by orbital perturbations, which is no longer centered at the origin (0,0). One of ordinary skill in the art will appreciate that the scenarios shown in FIG. 7 are associated with example values for the translational displacement variables $\delta_x$ and $\delta_z$ and that different values therefor may be used in various other instances.

Figure 8:
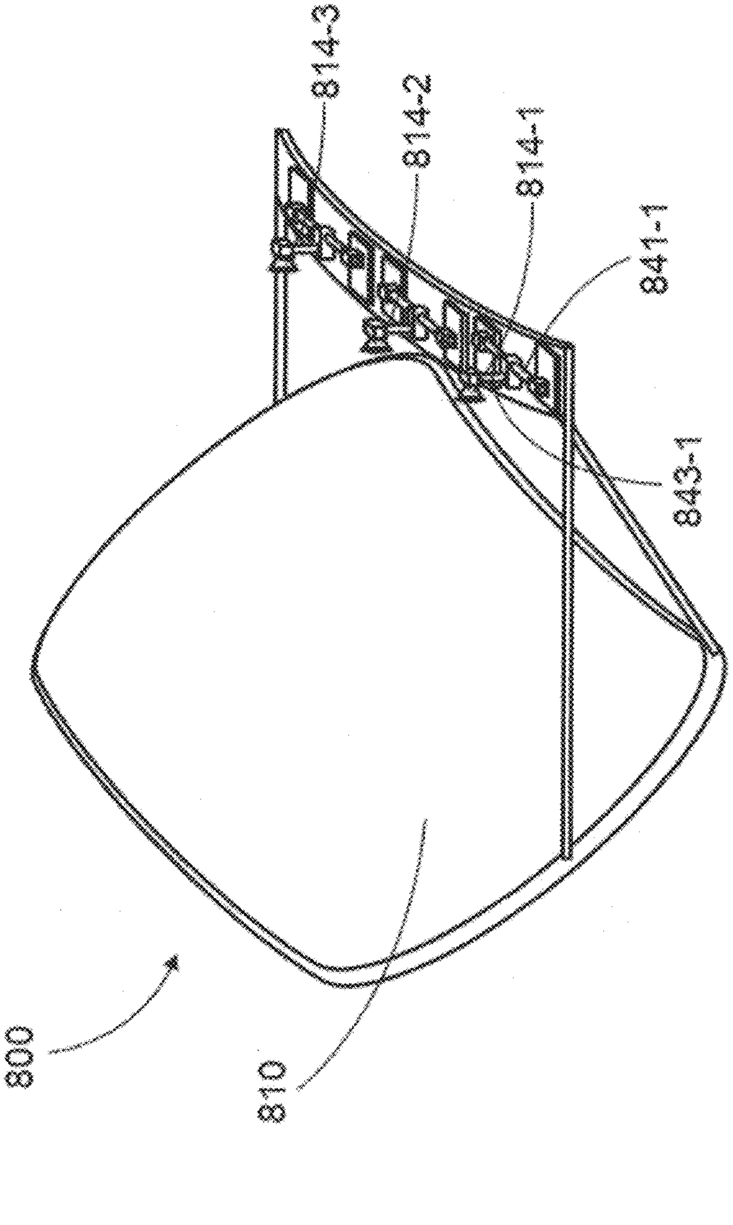
FIG. 8 illustrates an example antenna system with multiple feed antennae and a toroidal reflector in accordance with some implementations.

FIG. 8 illustrates an example antenna system 800 with multiple feed antennae and a toroidal reflector 810 in accordance with some implementations As shown in FIG. 8, the antenna system 800 includes multiple feed antennae 814-1, 814-2, and 814-3, each rectilinearly-translatable relative to a toroidal reflector 810. In the embodiment shown, each of the multiple feed antennae 814-1, 814-2, and 814-3 are also independently rectilinearly-translatable relative to each other. For example, this independent rectilinear-translation may be made possible by each of the multiple feed antennae 814-1, 814-2, and 814-3 including its own set of independently rotatable leadscrews. Continuing with this example, the feed antenna 814-1 includes a first leadscrew 841-1 capable of rectilinearly-translating the feed antenna 814-1 in a horizontal direction and a second leadscrew 843-1 capable of rectilinearly-translating the feed antenna 814-1 in a vertical direction. In such a configuration, the various feed antennae 814-1, 814-2, and 814-3 may each track separate satellites and/or a single satellite at different points in time. While the toroidal reflector 810 is depicted in FIG. 8, one of ordinary skill in the art will appreciate that other shapes and styles of reflectors, such as parabolic or non-parabolic, may also be used.

Figure 9:
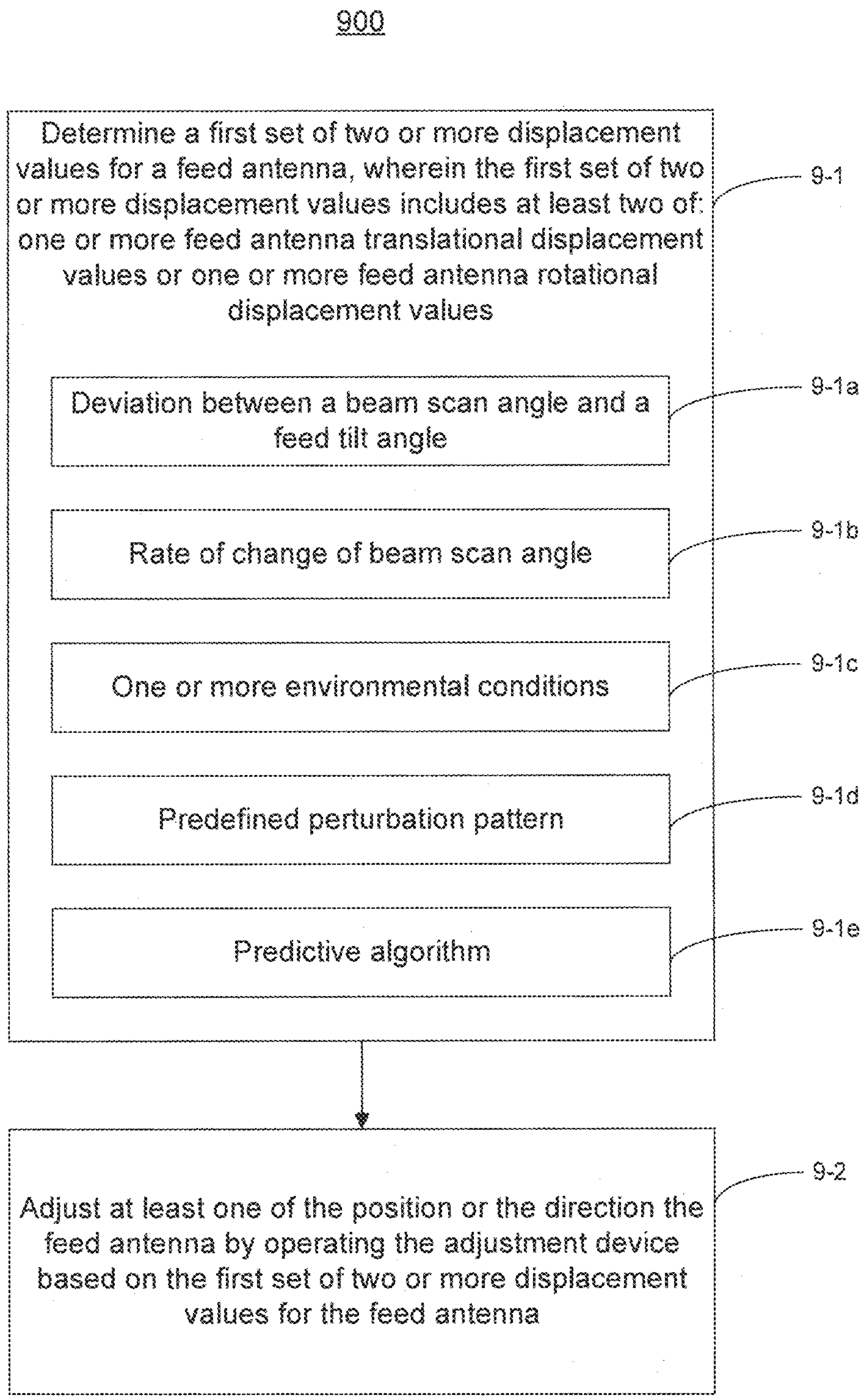
FIG. 9 is a flowchart representation of one method of adjusting a feed antenna in accordance with some implementations.

FIG. 9 is a flowchart representation of a method 900 of adjusting a feed antenna in accordance with some implementations. In various implementations, the method 900 is performed at a feed antenna controller (e.g., the feed antenna controller 314 in FIGS. 3 and 4, or the feed antenna controller 1100 in FIG. 11) coupled to a feed antenna (e.g., the feed antenna 312 in FIGS. 3, 4, and 6), wherein the feed antenna controller includes one or more processors, non-transitory memory, and an adjustment device (e.g., the adjustment device 1130 in FIG. 11). In some implementations, the method 900 is performed by processing logic, including hardware, firmware, software, or a combination thereof. In some implementations, the method 900 is performed by a processor executing code stored in a non-transitory computer-readable medium (e.g., a memory).

As represented by block 9-1, the method 900 includes determining a first set of two or more displacement values for the feed antenna, wherein the first set of two or more displacement values includes at least two of: one or more feed antenna translational displacement values or one or more feed antenna rotational displacement values. As one example, the first set of two or more displacement values corresponds to the rectilinear-translation with at least two directional components (e.g., a translation vector with x and z components such as the translational displacement value(s) ($\delta_x$, $\delta_z$) 556-2 discussed above with reference to FIG. 5B) within the focal plane of the feed antenna. According to some implementations, the feed antenna controller (sometimes also referred to herein as an "antenna control mechanism") utilizes one or more of the factors or elements described below with reference to blocks 9-1*a* to 9-1*e* when determining the first set of two or more displacement values for the feed antenna.

In some implementations, as represented by block 9-1*a*, the feed antenna is further coupled to one or more support arms that support the feed antenna relative to a reflector, and the feed antenna controller determines the first set of two or more displacement values for the feed antenna based on a deviation between a current feed tilt angle of a main lobe of an EM signal emanating from the feed antenna and a current beam scan angle of a target relative to the reflector. For example, see the equations described above with reference to FIG. 5B for calculating the translational displacement value(s) ($\delta_x$, $\delta_z$) 556-2, which correspond to the first set of two or more displacement values representing a first position for the feed antenna at a first time to account for the aforementioned deviation.

In some implementations, as represented by block 9-1*b*, the feed antenna controller determines the first set of two or more displacement values for the feed antenna based on a rate of change of the beam scan angle. For example, the first set of two or more displacement values is associated with a first step value when the rate of change in the beam scan angle is less than a threshold rate value, and wherein the first set of two or more displacement values is associated with a second step value greater than the first step value when the rate of change in the beam scan angle is greater than the threshold rate value. In this example, the threshold rate value corresponds to a deterministic value, a non-deterministic value (e.g., derived from recent and/or frequent deviations and/or rates of change thereof), and/or the like.

In some implementations, as represented by block 9-1*c*, the feed antenna controller determines the first set of two or more displacement values for the feed antenna based on one or more environmental conditions. For example, the one or more environmental conditions includes a wind speed value measured at the feed antenna controller, a wind shear value measured at the feed antenna controller, a temperature value measured at the feed antenna controller, a humidity value measured at the feed antenna controller, an atmospheric pressure value measured at the feed antenna controller, one or more seismological measurements measured at the feed antenna controller and/or at some other location(s), one or more particulate density values measured. at the feed antenna controller and/or at some other location(s) or altitude(s), and/or the like. Thus, the feed antenna controller may adjust the feed antenna to account for both the orbital perturbation pattern of a satellite and also for local environment al conditions such as wind shear, seismological activity, and/or the like.

In some implementations, as represented by block 9-1*d*, the feed antenna controller determines the first set of two or more displacement values for the feed antenna based on a predefined perturbation pattern associated with a target (e.g., a satellite). For example, the predefined perturbation pattern corresponds to a reoccurring Lissajous perturbation pattern of a satellite in geostationary orbit caused by its non-zero inclination or eccentricity in combination with the Earth's oblate ellipsoid shape, dynamic gravitational effects caused by the sun, moon, and/or other transient celestial bodies such as comets, asteroids, planets, etc., and/or the like. In another example, the predefined perturbation pattern corresponds to a reoccurring perturbation pattern of a satellite at a Lagrange point.

In some implementations, as represented by block 9-1*e*, the feed antenna controller determines the first set of two or more displacement values for the feed antenna based on a predictive algorithm. For example, the predictive algorithm takes into account a predicted position of a target due to a predefined or previously tracked perturbation pattern and future gravitational effects from one or more transient celestial bodies.

As represented by block 9-2, the method 900 includes adjusting at least one of the position or the direction of the feed antenna by operating the adjustment device based on the first set of two or more displacement values for the feed antenna. For example, the adjustment device 1130 in FIG. 11 enables translation and/or rotation of the feed antenna 312 with as many as 6DOF via the one or more motors based on the first set of two or more displacement values to account for the orbital perturbation of a satellite. In this example, the adjustment device 1130 changes the direction of the feed antenna 312 based on one or more rotational displacement values, and the adjustment device 1130 changes the position of the feed antenna 312 based on one or more translational displacement values.

In some implementations, the feed antenna (e.g., the feed antenna 312 in FIG. 3) is further coupled to one or more support arms (e.g., the at least one support arm 316 in FIG. 3) that support the feed antenna relative to a reflector (e.g., the parabolic reflector 310 in FIG. 3), and wherein the adjustment device (e.g., one or more components of the feed antenna controller 314 in FIG. 3) adjusts at least one of the position or the direction associated with the feed antenna relative to static positions for the one or more support arms and the reflector based on the first set of two or more displacement values for the feed antenna. For example, the adjustment device is configured to adjust a position and/or a direction of the feed antenna while the one or more support arms and the reflector remain stationary. Thus, the feed antenna controller is configured to adjust the position and/or direction of the feed antenna in order to track orbital perturbations associated with a satellite in geostationary orbit or at a Lagrange point without motorizing the reflector and/or support arms and also reducing onboard station-keeping resources and/or mechanisms associated with the satellite.

In some implementations, the feed antenna controller further includes a communication interface (e.g., the one or more communication interfaces 1108 in FIG. 11) that communicatively couples one or more processors (e.g., the one or more processing units 1102 in FIG. 11) and a non-transitory memory (e.g., the memory 1150 in FIG. 11) storing one or more programs with the adjustment device, and wherein the feed antenna controller determines the first set of two or more displacement values for the feed antenna using the one or more programs executed by the one or more processors. In some implementations, the communication interface corresponds to one of an internal data bus, a wireless communication interface, or a wired communication interface. In one example, the one or more processors, the non-transitory memory, and the adjustment device are included in a monolithic device and connected through an internal data bus. In another example, the one or more processor and the non-transitory memory, and the adjustment device are included in one or more separate devices connected through one or more wired communication channels (e.g., Universal Serial Bus (USB), 802.3[x], etc.) and/or one or more wireless communication channels (e.g., BLUETOOTH, 802.11[x], etc.).

According to some implementations, the feed antenna controller is further coupled to a second feed antenna, and the method 900 further includes determining a second set of two or more displacement values for the second feed antenna, wherein the first set of two or more displacement values for the feed antenna correspond to a first position of a target at time T and the second set of two or more displacement values for the second feed antenna correspond to a second position of the target at time T+N. For example, the feed antenna controller is configured to position the first feed antenna to initially track the target from 0 to Y seconds while the target is associated with a first range of positions and also pre-position the second feed antenna to subsequently track the target from Y+1 to Z seconds while the target is associated with a second range of positions that follow the first range of positions. As one example, FIG. 8 describes the antenna system 800 with a plurality of feed antennae 814-1, 814-2, and 814-3 capable of tracking separate satellites and/or a single satellite at different points in time.

Figure 10:
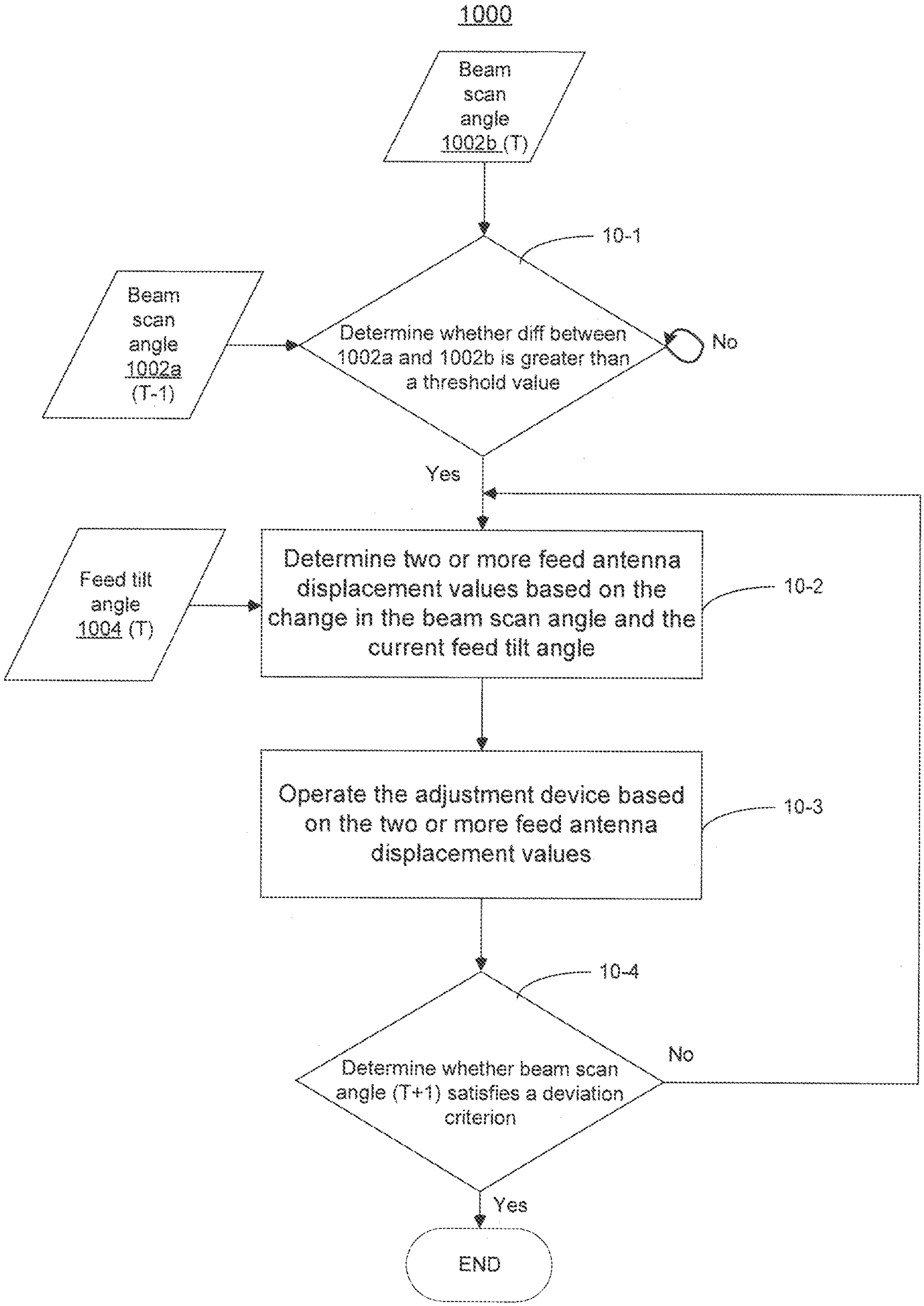
FIG. 10 is a flowchart representation of another method of adjusting a feed antenna in accordance with some implementations.

FIG. 10 is a flowchart representation of another method 1000 of adjusting a feed antenna in accordance with some implementations. In various implementations, the method 1000 is performed at a feed antenna controller (e.g., the feed antenna controller 314 in FIGS. 3 and 4, or the feed antenna controller 1100 in FIG. 11) coupled to a feed antenna (e.g., the feed antenna 312 in FIGS. 3, 4, and 6), wherein the feed antenna controller includes one or more processors, non-transitory memory, and an adjustment device (e.g., the adjustment device 1130 in FIG. 11). In some implementations, the method 1000 is performed by processing logic, including hardware, firmware, software, or a combination thereof. In some implementations, the method 1000 is performed by a processor executing code stored in a non-transitory computer-readable medium (e.g., a memory).

As represented by block 10-1, the method 1000 includes determining whether a difference (e.g., the magnitude of a delta) between a previous beam scan angle 1002*a* at time T−1 and a current beam scan angle 1002*b* at time T is greater than a threshold value. In one example, the threshold value corresponds to a deterministic value in degrees or radians, N standard deviations from the deterministic value, a non-deterministic value (e.g., derived from recent and/or frequent deviations), and/or the like.

If the difference is less than the threshold value (e.g., the "No" branch from block 10-1), the method 1000 repeats block 10-1. If the difference is greater than the threshold value (e.g., the "Yes" branch from block 10-1), the method 1000 continues to block 10-2.

As represented by block 10-2, the method 1000 includes determining two or more displacement values for the feed antenna based on the current beam scan angle 1002*b* at time T and a current feed tilt angle 1004 at time T associated with a main lobe of an EM signal emanating from the feed antenna. For example, see the equations described above with reference to FIG. 5B for calculating the displacement value(s) ($\delta_x$, $\delta_z$) 556-2 (e.g., the first set of two or more displacement values).

As represented by block 10-3, the method 1000 includes operating the adjustment device based on the two or more displacement values for the feed antenna. For example, the feed antenna controller operates the adjustment devices to adjust a direction and/or a position (e.g., rectilinear-translation with at least two directional components such as the translational displacement value(s) ($\delta_x$, $\delta_z$) 556-2 discussed above with reference to FIG. 5B) of the feed antenna.

As represented by block 10-4, after adjusting at least one of a position or a direction of the feed antenna, the method 1000 includes determining whether a deviation between a beam scan angle at time T+1 and a feed tilt angle at time T+1 satisfies a deviation criterion. For example, the deviation criterion is satisfied when the deviation is less than a deterministic tolerance value in degrees or radians, a non-deterministic tolerance value based on the change or rate of change of the beam scan angles between times T−1 and T, or the like.

If the deviation does not satisfy the deviation criterion (e.g., the "No" branch from block 10-4), the method 1000 repeats block 10-2 and determines a second set of two or more displacement values for the feed antenna. If the deviation satisfies the deviation criterion (e.g., the "Yes" branch from block 10-4), the method 1000 terminates.

Figure 11:
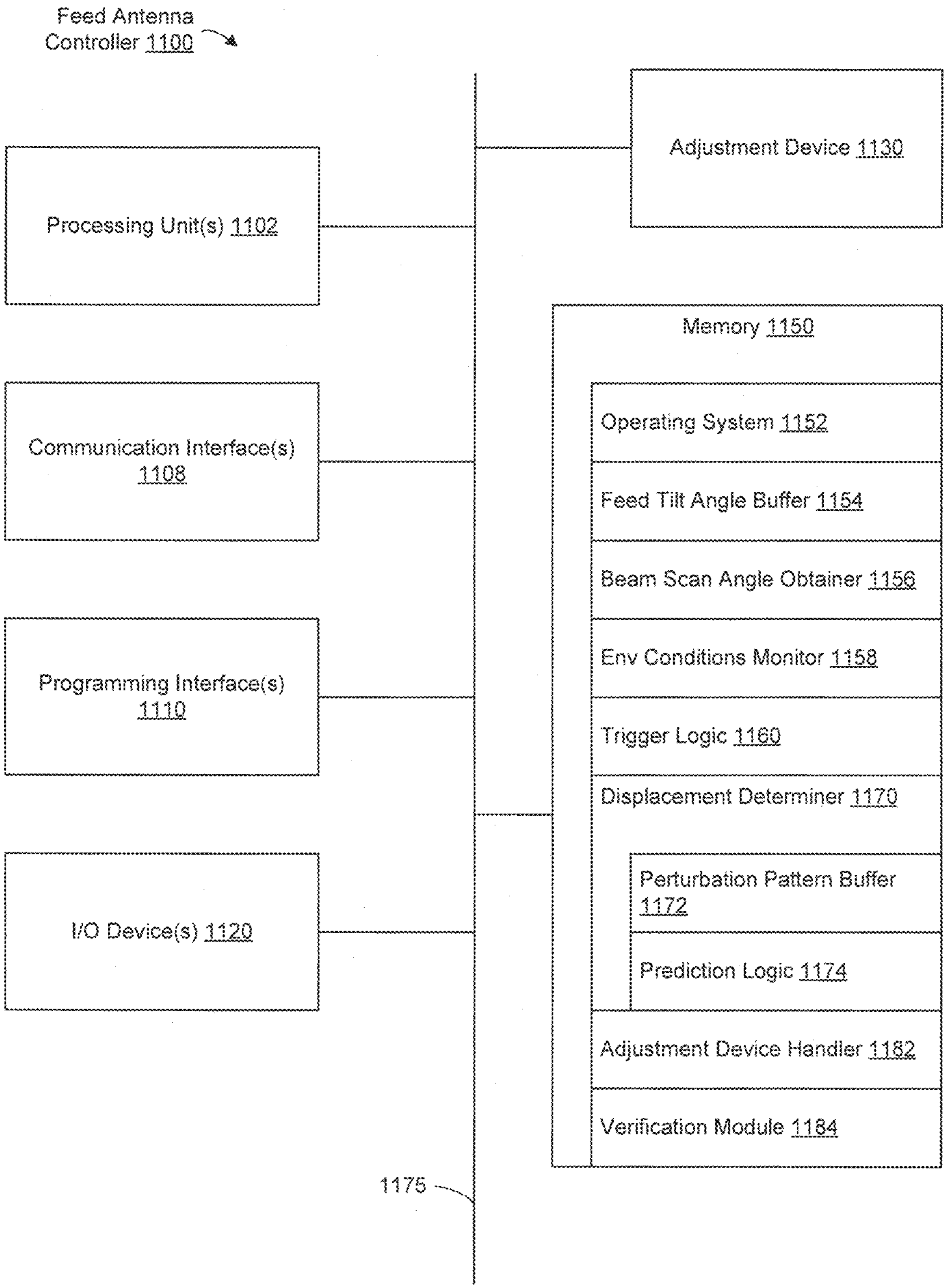
FIG. 11 is a block diagram of a feed antenna controller in accordance with some implementations.

FIG. 11 is a block diagram of an example feed antenna controller 1100 in accordance with some implementations. For example, the feed antenna controller 1100 corresponds to the feed antenna controller 314 in FIGS. 3 and 4. As shown in FIG. 11, the feed antenna controller 1100 includes one or more processing units 1102 (e.g., microprocessors, application-specific integrated-circuits (ASICs), field-programmable gate arrays (FPGAs), graphics processing units (GPUs), central processing units (CPUs), processing cores, and/or the like), one or more communication interfaces 1108 (e.g., universal serial bus (USB), IEEE 802.3[x], IEEE 802.11[x], IEEE 802.15[x], IEEE 802.16[x], infrared (IR), BLUETOOTH, ZIGBEE, and/or the like type interface), one or more programming interfaces 1110 (e.g., an application programming interface (API)), one or more input/output (I/O) devices 1120, an adjustment device 1130, a memory 1150, and one or more communication buses 1175 for interconnecting these and various other components.

In some implementations, the one or more I/O devices 1120 include at least one of a keyboard, a mouse, a touchpad, a touch-screen, a joystick, one or more microphones, one or more speakers, one or more displays, one or more image sensors, an accelerometer, a gyroscope, an inertial measurement unit (IMU), a temperature sensor, a humidity sensor, an air pressure sensor, an anemometer, a particulate matter sensor, a seismometer, and/or the like.

In some implementations, the adjustment device 1130 includes: one or more motors (e.g., servo motors, stepper motors, etc.) or the like coupled to the feed antenna via one or more leadscrews or the like, and a motor controller configured to control the one or more motors based on feedback therefrom (e.g., a proportional-integral-derivative (PID) controller). For example, the adjustment device 1130 enables translation and/or rotation of the feed antenna 312 with as many as 6DOF via the one or more motors. For example, the adjustment device 1130 (e.g., one or more components of the feed antenna controller 314 in FIGS. 3 and 4) is coupled to the feed antenna (e.g., the feed antenna 312 in FIGS. 3, 4, and 6), which in turn is supported by one or more support arms (e.g., the at least one support arm 316 in FIG. 3) relative to a reflector (e.g., the parabolic reflector 310 in FIG. 3).

In some implementations, the one or more communication buses 1175 may include circuitry that interconnects and controls communications between system components.

In some implementations, the memory 1150 includes random-access memory such as dynamic random-access memory (DRAM), static random-access memory (SRAM), double-data-rate random-access memory (DDR RAM), or other random-access solid-state memory devices. In some implementations, the memory 1150 includes non-volatile memory, such as one or more magnetic disk storage devices, optical disk storage devices, flash memory devices, or other non-volatile solid-state storage devices. In some implementations, the memory 1150 optionally includes one or more storage devices remotely located from the one or more processing units 1102. In some implementations, the memory 1150 comprises a non-transitory computer readable storage medium. In some implementations, the memory 1150 or the non-transitory computer readable storage medium of the memory 1150 stores the programs, modules and data structures, or a subset thereof described herein.

In some implementations, the feed antenna controller 1100 includes an operating system 1152 including procedures for handling various basic system services and for performing hardware dependent tasks.

In some implementations, the feed antenna controller 1100 includes a feed tilt angle buffer 1154 configured to store the current feed tilt angle of a main lobe of an EM signal emanating from or towards the feed antenna. According to some implementations, the feed tilt angle buffer 1154 may include a plurality of feed tilt angles for different times (e.g., T−N, . . . , T−1, T, etc.).

In some implementations, the feed antenna controller 1100 includes a beam scan angle obtainer 1156 configured to obtain (e.g., receive, retrieve, or generate/calculate) a beam scan angle of a target (e.g., a satellite) relative to the static reference point (e.g., the one or more support arms and/or the reflector). For example, the one or more support arms (e.g., the at least one support arm 316 in FIG. 3) support the feed antenna (e.g., the feed antenna 312 in FIGS. 3, 4, and 6) relative to the reflector (e.g., the parabolic reflector 310 in FIG. 3), and wherein the static reference point corresponds to at least one of the reflector or the one or more support arms. For example, the beam scan angle obtainer 1156 may include a buffer storing a plurality of beam scan angles for different times (e.g., T−N, . . . , T−1, T, etc.). To that end, in various implementations, the beam scan angle obtainer 1156 may include instructions and/or logic therefor, and heuristics and metadata therefor.

In some implementations, the feed antenna controller 1100 includes an environmental conditions monitor 1158 configured to obtain (e.g., receive or retrieve) and refresh values associated with one or more environmental conditions, such as a wind speed value measured at the feed antenna controller 1100, a wind shear value measured at the feed antenna controller 1100, a temperature value measured at the feed antenna controller 1100 and/or other location(s), a humidity value measured at the feed antenna controller 1100 and/or other location(s), an atmospheric pressure value measured at the feed antenna controller 1100 and/or other location(s), one or more seismological measurements measured at the feed antenna controller 1100 and/or at some other location(s), one or more particulate density values measured at the feed antenna controller 1100 and/or at some other altitude(s), and/or the like, based on data from the I/O devices 1120. To that end, in various implementations, the environmental conditions monitor 1158 may include instructions and/or logic therefor, and heuristics and metadata therefor.

In some implementations, the feed antenna controller 1100 includes trigger logic 1160 configured to detect a change in a beam scan angle of a target relative the static reference point (e.g., the one or more support arms and/or the reflector) and provide an indication thereof to the displacement determiner 1170 to determine the first set of two or more displacement values for the feed antenna in response thereto. To that end, in various implementations, the trigger logic 1160 may include instructions and/or logic therefor, and heuristics and metadata therefor.

In some implementations, the feed antenna controller 1100 includes a displacement determiner 1170 configured to determine a first set of two or more displacement values for the feed antenna, wherein the first set of two or more displacement values includes at least two of: one or more feed antenna translational displacement values or one or more feed antenna rotational displacement values. For example, the displacement determiner 1170 determines the first set of two or more displacement values for the feed antenna in response to receiving an indication from the trigger logic 1160 associated with the change in the beam scan angle. To that end, in various implementations, the displacement determiner 1170 may include instructions and/or logic therefor, and heuristics and metadata therefor.

In some implementations, the displacement values determiner 1170 includes a perturbation pattern buffer 1172 and prediction logic 1174. In some implementations, the perturbation pattern buffer 1172 is configured to store one or more predefined perturbation patterns associated with a target (e.g., a satellite) such as a reoccurring Lissajous perturbation pattern of a satellite in geostationary orbit or the like.

In some implementations, the prediction logic 1174 is configured to determine the first set of two or more displacement values for the feed antenna based on a predictive algorithm. For example, the predictive algorithm takes into account a predicted position of a target (e.g., a satellite) due to future gravitational effects from one or more transient celestial bodies. To that end, in various implementations, the prediction logic 1174 may include instructions and/or logic therefor, and heuristics and metadata therefor.

In some implementations, the feed antenna controller 1100 includes an adjustment device handler 1182 configured to adjust at least one of the position or the direction of the feed antenna by operating the adjustment device 1130 based on the first set of two or more displacement values for the feed antenna. To that end, in various implementations, the adjustment device handler 1182 may include instructions and/or logic therefor, and heuristics and metadata therefor.

In some implementations, the feed antenna controller 1100 includes a verification module 1184 configured to determine whether a deviation between a beam scan angle at time T+1 and a feed tilt angle at time T+1 satisfies a deviation criterion after adjusting at least one of the position or the direction of the feed antenna according to the first set of two or more displacement values. As one example, in response to determining that the deviation between the beam scan angle at time T+1 and the feed tilt angle at time T+1 satisfies the deviation criterion, the verification module 1184 is configured to forgo further adjustments. As another example, in response to determining that the deviation between the beam scan angle at time T+1 and the feed tilt angle at time T+1 does not satisfy the deviation criterion, the verification module 1184 is configured to provide an indication of the deviation to the displacement determiner 1170 in order to determine a second set of two or more displacement values for the feed antenna. To that end, in various implementations, the verification module 1184 may include instructions and/or logic therefor, and heuristics and metadata therefor.

Although the feed tilt angle buffer 1154, the beam scan angle obtainer 1156, the environmental conditions monitor 1158, the trigger logic 1160, the displacement determiner 1170, the adjustment device handler 1182, and the verification module 1184 are shown as residing on a single device (e.g., the feed antenna controller 1100), it should be understood that in other implementations, any combination of the feed tilt angle buffer 1154, the beam scan angle obtainer 1156, the environmental conditions monitor 1158, the trigger logic 1160, the displacement determiner 1170, the adjustment device handler 1182, and the verification module 1184 may be located in separate computing devices.

FIG. 11 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first member could be termed a second member, and, similarly, a second member could be termed a first member, which changing the meaning of the description, so long as all occurrences of the "first member" are renamed consistently and all occurrences of the "second member" are renamed consistently. The first member and the second member are both members, but they are not the same member.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A feed antenna controller, comprising:

an adjustment device coupled to a feed antenna, wherein the adjustment device adjusts at least two of six degrees of freedom of the feed antenna relative to one or more static support arms that couple the feed antenna controller to a reflector, and wherein the six degrees of freedom include three translational degrees of freedom and three rotational degrees of freedom.

2. The feed antenna controller of claim 1, wherein at least one of: a position of the feed antenna is translatable relative to the one or more static support arms and the reflector, or a direction of the feed antenna is rotatable relative to the one or more static support arms and the reflector.

3. The feed antenna controller of claim 1, wherein adjusting at least two of six degrees of freedom of the feed antenna relative to the one or more static support arms that couple the feed antenna controller to the reflector includes rectilinearly-translating the feed antenna within a plane relative to the one or more static support arms and the reflector.

4. The feed antenna controller of claim 1, further comprising multiple feed antennae that are at least one of translatable or rotatable relative to the one or more static support arms.

5. The feed antenna controller of claim 4, wherein at least two of the feed antennae are independently translatable or rotatable relative to each other.

6. The antenna feed controller of claim 1, wherein the adjustment device includes one or more motors coupled to the feed antenna, and the antenna feed controller further comprising:

one or more processors;

a non-transitory memory storing one or more programs, which when executed by the one or more processors cause the adjustment device to adjust at least two of six degrees of freedom of the feed antenna relative to the one or more static support arms that couple the feed antenna controller to the reflector via the one or more motors; and a communication interface that communicatively couples the one or more processors and the transitory memory storing one or more programs with the adjustment device.

7. The antenna feed controller of claim 6, wherein the feed antenna controller adjusts at least two of six degrees of freedom of the feed antenna in response to detecting a change in a beam scan angle with a magnitude greater than a threshold value.

8. The antenna feed controller of claim 6, wherein adjusting at least two of six degrees of freedom of the feed antenna is based at least in part on a deviation between a current feed tilt angle of a main lobe of an electromagnetic (EM) signal emanating from the feed antenna and a current beam scan angle of a target relative to the reflector.

9. The antenna feed controller of claim 1, wherein adjusting at least two of six degrees of freedom of the feed antenna is based at least in part on at least one of: one or more environmental conditions or a predefined perturbation pattern associated with a target.

10. A method performed by a feed antenna controller coupled to a feed antenna, wherein the feed antenna controller includes an adjustment device for adjusting at least one of a position or a direction associated with the feed antenna, the method comprising:

detecting a change in a beam scan angle of a target relative to a reflector, wherein one or more static support arms couple the feed antenna controller to a reflector;

in response to detecting the change in the beam scan angle of the target relative to the reflector, determining a first set of two or more displacement values for the feed antenna based at least in part on a deviation between a current feed tilt angle of a main lobe of an electromagnetic (EM) signal emanating from the feed antenna and a current beam scan angle of a target relative to the reflector, wherein the first set of two or more displacement values includes adjustments to at least two of six degrees of freedom of the feed antenna relative to the one or more static support arms that couple the feed antenna controller to the reflector, and wherein the six degrees of freedom include three translational degrees of freedom and three rotational degrees of freedom; and adjusting at least one of the position or the direction of the feed antenna by operating the adjustment device based on the first set of two or more displacement values for the feed antenna.

11. The method of claim 10, wherein the feed antenna controller furthers includes a communication interface that communicatively couples one or more processors and a non-transitory memory storing one or more programs associated with the adjustment device, and wherein the feed antenna controller determines the first set of two or more displacement values for the feed antenna using the one or more programs executed by the one or more processors.

12. The method of claim 11, wherein the communication interface corresponds to one of an internal data bus, a wireless communication interface, or a wired communication interface.

13. The method of claim 10, wherein the feed antenna controller determines the first set of two or more displacement values for the feed antenna in response to detecting the change in the beam scan angle with a magnitude greater than a threshold value.

14. The method of claim 10, further comprising:

after adjusting at least one of the position or the direction of the feed antenna, determining whether the deviation between the beam scan angle and the current feed tilt angle of the main lobe of the EM signal emanating from the feed antenna satisfies a deviation criterion; and in response to determining that the deviation between the beam scan angle and the current feed tilt angle of the main lobe of the EM signal emanating from the feed antenna does not satisfy the deviation criterion, determining a second set of two or more displacement values for the feed antenna.

15. The method of claim 10, wherein the feed antenna controller determines the first set of two or more displacement values for the feed antenna based on a rate of change in the beam scan angle, wherein the first set of two or more displacement values is associated with a first step value when the rate of change in the beam scan angle is less than a threshold rate value, and wherein the first set of two or more displacement values is associated with a second step value greater than the first step value when the rate of change in the beam scan angle is greater than the threshold rate value.

16. The method of claim 10, wherein the feed antenna controller determines the first set of two or more displacement values for the feed antenna based at least in part on one or more environmental conditions.

17. The method of claim 10, wherein the feed antenna controller determines the first set of two or more displacement values for the feed antenna based at least in part on a predefined perturbation pattern associated with the target.

18. The method of claim 10, wherein the feed antenna controller is further coupled to a second feed antenna, and the method further comprising:

determining a second set of two or more displacement values for the second feed antenna, wherein the first set of two or more displacement values for the feed antenna correspond to a first position of a target at time T and the second set of two or more displacement values for the second feed antenna correspond to a second position of the target at time T+N.

19. An antenna system comprising:

a reflector;

a feed antenna capable of transmitting and receiving electromagnetic (EM) signals reflected by the reflector;

one or more static support arms coupled to the reflector for supporting the feed antenna; and a feed antenna controller coupled to the feed antenna, wherein the feed antenna controller includes an adjustment device configured to adjust at least two of six degrees of freedom of the feed antenna relative to the one or more static support arms that couple the feed antenna controller to the reflector, and wherein the six degrees of freedom include three translational degrees of freedom and three rotational degrees of freedom.

20. The antenna system of claim 19, wherein the feed antenna controller further includes:

one or more processors; and a non-transitory memory storing one or more programs, which when executed by the one or more processors cause the adjustment device to adjust at least two of six degrees of freedom of the feed antenna based at least in part on a change in a beam scan angle of a target relative to the reflector and a current feed tilt angle of a main lobe of the EM signal emanating from the feed antenna.

* * * * *